United States Patent [19]

Detroit

[11] 4,293,459

[45] Oct. 6, 1981

[54] ASPHALT EMULSION-CONDITIONER

[75] Inventor: William J. Detroit, Schofield, Wis.

[73] Assignee: American Can Company, Greenwich, Conn.

[21] Appl. No.: 46,377

[22] Filed: Jun. 7, 1979

[51] Int. Cl.³ .................. C08L 1/26; C08L 89/00; C08L 95/00; C08L 97/00

[52] U.S. Cl. ...................... 260/17.5; 106/123 LC; 106/145; 106/191; 106/202; 106/277; 106/316; 252/311.5; 260/28.5 AS

[58] Field of Search ............... 106/123 LC, 277, 123, 106/145, 191, 316, 202; 260/124 R, 28.5 AS, 17.5; 252/311.5

[56] References Cited

U.S. PATENT DOCUMENTS

| | | | |
|---|---|---|---|
| 2,491,832 | 12/1949 | Salvesen | 260/124 R |
| 3,053,779 | 9/1962 | O'Neill | 260/17.5 |
| 3,859,227 | 1/1975 | Dwyer | 106/277 |
| 3,956,002 | 5/1976 | Moorer | 106/277 |
| 4,069,217 | 1/1978 | Detroit et al. | 260/124 R |
| 4,088,505 | 5/1978 | Moorer | 106/277 |

OTHER PUBLICATIONS

Chem. Abst. 65: 6983h-65: 6984a.

*Primary Examiner*—Allan Lieberman
*Attorney, Agent, or Firm*—Robert P. Auber; Ernestine C. Bartlett

[57] ABSTRACT

Asphalt emulsion conditioner compositions, derived from spent sulfite liquor lignosulfonates, and asphalt emulsions produced from such compositions are provided. The emulsions are of the slow-setting, anionic type and are further characterized by their ability to remain stable on storage although produced with equipment that generates a wide range of shearing forces. Such characteristics are imparted to the asphalt emulsions through the use of emulsion-conditioner compositions comprising a partially desulfonated lignosulfonate, preferably an anionic or nonionic emulsifying agent and, optionally, a thickener.

21 Claims, No Drawings

ASPHALT EMULSION-CONDITIONER

BACKGROUND OF THE INVENTION

Asphaltic substances are well known in the art. Generally pitchy or oleaginous materials, they include a wide variety of substances including bitumens, liquid and solid hydrocarbons, natural and synthetic resins, ester gums, stearines, and/or waxes together with fluxing oils which may be petroleum products, drying or nondrying oils or fatty acids, etc. Such materials generally have the common characteristic of being immiscible with water and becoming fusible with heat. Under proper conditions, asphaltic materials form aqueous emulsions with emulsifying agents. The emulsions comprise the asphaltic material in liquid or semi-solid form dispersed as minute, discrete globules or particles which do not coalesce but which, when mixed with mineral aggregate, will break and cause the asphalt to deposit on the aggregate. Subsequently, the asphaltic materials cure to form an agglomerated coalescent or coherent mass.

Asphalt emulsions are widely used in highway construction, surfacing and maintenance. They are also used in various other applications where water repellent surfaces are needed. Slow-setting emulsions are grades of emulsions that are sufficiently stable to allow mixing with fine or dusty aggregate mineral particles and further processing before setting to a coherent mass. Such grades of asphalt emulsions (SS-1 grade), when anionic, react chemically with portland cement constituents forming a water-insoluble salt and thus possess valuable water-resistant characteristics.

Asphalt emulsions generally contain stabilizers which retard the settling of finely divided particles. A typical method of producing the emulsions comprises the step of combining the asphalt with the emulsifier and subjecting the mixture to mechanical shearing action such as that generated in a colloid mill or homogenizer to form droplets of asphaltic material that are quickly covered by the emulsion-conditioner to provide a stable emulsion. Typical emulsifying agents include certain thermoplastic resins, derived from Southern pipe stumps and comprising a complex mixture of high molecular weight phenolic compounds and resin acids, available commercially as VINSOL resins from Hercules Powder Co. or certain Kraft lignins available commercially as INDULIN from Westvaco, Inc. Such currently available emulsifying agents are not always satisfactory in performance and are relatively expensive.

Lignosulfonates, present in spent sulfite waste liquor which results as a by-product of paper pulping operations, represent a particularly attractive source of raw material for conversion into more valuable products, particularly since waste liquor disposal is a problem for many paper manufacturers who must meet pollution standards. However, in spite of the general knowledge of certain dispersing properties of lignosulfonates, attempts to provide waste liquor lignosulfonates for use in asphalt emulsions have been largely unsuccessful. Equipment currently used in industry to produce asphalt emulsions embody any number of rotor-stator designs. The equipment design generates shearing forces that vary over a wide range, e.g., from the extremely high shearing forces of a Manton Gaulin mill to the relatively medium shearing forces of a Charlotte collid mill to the relatively lower shearing forces of a P&O machine type mill. VINSOL resins and INDULIN additives apparently are operable with such high and medium shear mills. However, attempts to produce emulsions with spent liquor lignosulfonates on such colloid mills that generate low to moderate shearing forces and that exert a slow shearing action when the components are initially admixed have not been successful, resulting in unstable emulsions containing large particles of the order of 50 microns or so. Such large particles have a grainy appearance and render the emulsions unstable upon storage, the large particles settling out of the emulsion after a short period of time. Such large particles additionally render the emulsions too unstable to be useful in many of the desirable applications, for example, as slurry seals. Thus spent liquor lignosulfonates, although abundantly and economically available, have not been commercially utilized in this area.

It is an object of this invention to provide lignosulfonate based emulsion-conditioner compositions for use in asphalt emulsions.

It is another object of this invention to provide asphalt emulsions comprising lignosulfonates derived from waste sulfite liquor which may be produced over the wide range of shearing forces generated by asphalt emulsion equipment employed in the industry.

These and other objects of the invention will be apparent from the description of the invention which follows.

GENERAL DISCLOSURE

Lignosulfonates are generally considered to be macromolecules built up by complex condensation of phenyl propane units, varying in molecular weight from about 1,000 to about 50,000. The sulfonate groups are attached to the aliphatic side chain. In solution, lignosulfonate molecules are regarded as sub-colloidal, high molecular weight polyelectrolytes solubilized primarily by phenolic and sulfonic polar and ionized groups. Lignosulfonates are higly dissociated in water and the molecules are highly charged by hydrolytic dissociation. Stabilization of an asphalt emulsion results from the adsorption of the lignosulfonate molecules at the asphalt droplet surface. This results in a charge build-up at the asphalt/water interface, causing a mutual electrokinetic repulsion between emulsion particles having the same charge and the formation of a semi-rigid film at the interface, not unlike the absorptive films formed by hydrophilic protective colloids. This strong stabilization is valuable where long-standing emulsion sediments can be remixed with agitation, allowing particle break-up without destabilization.

Such lignosulfonate materials are derived from lignin, generally in one of two forms, i.e. as sulfonated lignin or as sulfite lignosulfonates. These derivatives are very different in properties and characteristics due primarily to the different methods of extraction of the lignins from the woody material.

Alkali or Kraft lignins are generally prepared by cooking woodchips with a 10% solution of a mixture of sodium hydroxide with about 20 mole percent of sodium sulfide resulting in a sodium modified compound which is very soluble in the strongly alkaline solutions. The alkali lignins are removed from solution by lowering the pH to the acid side whereby the alkali lignins precipitate. INDULIN asphalt emulsifiers currently available are representative of alkali lignin products employed in the art. These precipitated unsulfonated, alkali lignins may be utilized to prepare sulfonated derivatives, typically by treating them with a solution of alkali sulfite or alkali sulfite and alkylaldehydes at elevated temperature and pressure. The degree of sulfonation or sulfoalkylation may be controlled to provide a variety of sulfonated or sulfoalkylated alkali lignins.

Sulfite lignins, the other principal type of lignin derivative, are generally produced by cooking woodchips under pressure in a solution of sulfurous acid and calcium, magnesium, sodium or ammonium bisulfite to produce cellulose pulp. The lignosulfonates are present in the waste or spent sulfite liquor (the waste cooking liquor) as a mixture with carbohydrate products and are recoverable by various methods well known in the art.

Thus, a basic factor which differentiates Kraft liqnosulfonates from lignosulfonates derived from spent sulfite liquor is the mode by which they are sulfonated. Kraft lignins may be sulfonated after extraction of the lignin from the wood product while lignosulfonates derived from spent sulfite liquor emerge from the pulping process already sulfonated and containing sulfonic sulfur in amounts varying from about 4 to as much as 10 weight percent, depending on the particular conditions of the pulping and subsequent process steps.

This invention relates to emulsion-conditioners for asphalt emulsions comprising lignosulfonates derived from waste sulfite liquor hereafter referred to as "the lignosulfonates". The invention also relates to the use of said emulsion-conditioner compositions in the production of slow-setting, anionic asphalt emulsions with typically slow shear equipment commonly employed in the asphalt industry.

It has been discovered that the lignosulfonates, either in the whole liquor form, i.e. before removal of carbohydrates, sugars, etc., or in purified form, whether derived from a hardwood or softwood source, when desulfonated to a predetermined extent, are particularly effective in forming asphalt emulsions on equipment that generates relatively low to moderate shearing forces and which exert a slow shearing action on the emulsion components when they are initially admixed.

In general, the emulsion-conditioner compositions of the invention will comprise (a) from about 80 to 100 weight percent of a partially desulfonated lignosulfonate derived from spent sulfite liquor and that has been subjected to alkaline hydrolysis and partial desulfonation, or mixtures of such lignosulfonates, said lignosulfonates being characterized by a relative molecular size of substantially within the range of about 1,000 to 50,000 and containing organic sulfonic sulfur after partial desulfonation of less than about 3 weight percent; (b) from about 0 to 20, preferably about 5 to 15 weight percent of an anionic or nonionic emulsifying agent; and (c) from 0 to 5 weight percent of a thickener.

Asphalt emulsions produced from such compositions will comprise from about 0.5 to 1.5 weight percent of the emulsion-conditioner composition of the invention and a minimum of about 57 weight percent asphalt with the remainder of the emulsion being the aqueous phase.

In general, lignosulfonates derived from spent sulfite liquor by any of means known in the art are suitable for use as emulsion conditioners in accordance with the invention. Such substances may be desulfonated and hydrolyzed to the necessary extent in the "as is" or whole liquor condition emanating from a sulfite wood pulping process or they may first be purified to remove the sugars and other saccharide constituents and/or to remove additional inorganic constituents. They may be obtained as alkaline, oxidized, hydrolyzed, partially desulfonated lignosulfonates, for example pursuant to the well-known "Vanillin Process" as described in U.S. Pat. No. 2,491,832 issued Dec. 20, 1949. According to this process, the degree of desulfonation realized is a factor of and is controlled by the amount of caustic interjected for the reaction; the strength of the oxidation effected (i.e. the relative amount of air or oxygen employed); the reaction time and temperature and solids dilution of the effluent being treated. While suitable partially desulfonated lignosulfonate materials may be prepared in accordance with the method of said patent by alkaline oxidation conducted on a spent sulfite liquor containing, on a weight percent basis, from about 30 to 35% of dissolved solids, the spent sulfite liquors being cooked in the desulfonation process may have as little as 14 to 10% to as much as 40% solids content. One example of a satisfactory proportion of liqnosulfonate solids to caustic will be such as to maintain the reaction mass in the relatively high pH range of about 10.5 and 11.

Alternatively, suitable lignosulfonates for use herein may be derived by cooking spent sulfite liquors of lignosulfonate products already separated therefrom, with or without purification, in alkaline medium at temperatures in the range of about 80° C. to 250° C., and preferably at 230° C., for a period of time sufficient to effect the necessary degree of desulfonation.

Several lignosulfonates of various types which are partially desulfonated to the prescribed extent are commercially available from the American Can Company. Examples are materials available under the trademarks "MARASPERSE CBX-2", an oxidized, desulfonated softwood spent liquor residue from a vanillin recovery process as disclosed in U.S. Pat. No. 2,491,832; "MARACELL XE", an oxidized, desulfonated hardwood product; "OPCOLIG A", an oxidized desulfonated softwood residue from the vanillin recovery process, etc. Such products are eminently suitable as the desulfonated component of the composition. Alternatively, lignosulfonates which contain sulfonic sulfur above 3% and which may be desulfonated by cooking in alkaline medium and at temperatures in said 80° C. to 250° C. range are also commercially available from the American Can Company. Such materials are exemplified by "NORLIG 41" a crude spent sulfite lignosulfonate; "MARASPERSE N-42", a hardwood spent sulfite lignosulfonate; etc. Typical analysis and physical characteristics of many of these products may be found in "The Chemistree Book—A Handbook On Lignin Chemicals" published by the American Can Company of Greenwhich, Conn.

The anionic and nonionic emulsifying agents may be any of such compounds that are well known in the art. Illustrative examples include nonionics based on polyoxyethylene, for example alkylaryl polyether alcohols or alkylphenol ethers of polyethylene glycol, for example such polyols of the formula R—Aryl—$(OCH_2CH_2)_xOH$ wherein R is an alkyl chain and X designates the number of oxyethylene units present. The nonyl compounds, i.e. where R is nonyl as in polyoxyethylenated nonyl phenols, are especially preferred. Such compounds are available under the trademark TRITON (from Rohm and Hass Co.). Especially preferred is a polyoxyethylenated nonyl phenol available commercially as T-DET-N-307 (from Thompson Hayward Corp., Kansas City, Mo.). Additional examples of suitable emulsifying agents include aliphatic polyols and alkyl ethers of alkylene glycols including polyethylene glycols, commercially available under the trademark CARBOWAX (from Union Carbide); ethylene oxide consensation products with fatty amines available under the trademark ETHOMEEN (from Akzona Corp., Chicago, Ill.); sodium alkaryl sulfonates as well as sodium alkyl sulfonates, etc.

Various thickeners well known in the art may also be employed if desired. Illustrative examples include casein, albumin and the like. Additionally, polymeric materials that may also be employed include carboxyvinyl polymers available commercially under the trademark CARBOPOL 934, 940, and 941 (from B. F. Goodrich Co.), carboxymethyl cellulose, carboxymethylhydroxyethyl cellulose, and glucose biopolymers available commercially as KELZAN XC polymer (from Kelco Chemical Co.), etc.

The asphaltic component of the emulsions may be selected from asphalts of various grades, preferably having a penetration between 40 to 250 as determined by ASTM Test No. D5-25 "Penetration of Bituminous Materials". Straight run asphalts as well as asphalts from cracking operations and blown asphalts may be employed either singly or in combination. Asphalts derived, for example from Mid Continent, Mid East and Venezuelan crude oils are all contemplated for use herein.

The emulsions of this invention are designed to exhibit satisfactory characteristics when produced on colloid mills having low initial shear i.e., on that wide range of colloidal mill equipment that generate initial shearing forces that are less than those generated in high shear equipment. It has been discovered that although emulsions which satisfactorily meet the requirements of many of the ASTM specifications for SS-1 type emulsions may be produced on any of several different types of high shear colloid mills, when colloid mills are utilized that generate low to moderate shearing forces and initially slow shearing action, unacceptable grainy emulsions result. Shearing force as used herein is used empirically primarily because the shearing force generated at any particular time during the emulsion production will depend to a great extent on the design and operation of the particular mill. For example, the conventional medium shear Charlotte colloid mill (as manufactured by Chemicolloid Laboratories, Inc. of Garden City Park, N.Y.) has a rotor design that is a serrated cone and wherein efficiency depends upon shearing action developed by centrifugal force down the entire length of the rotor. Initial shearing action imposed on the asphalt and the emulsion conditioner is slow in this type of mill. A conventional high shear mill, for example, the Manton Gaulin colloid mill (as manufactured by M. G. Manufacturing Co., Inc., Everett, Mass.) utilizes a design with rotor knife blades which impose high initial shearing action on the asphalt and emulsion conditioner and generate high shearing forces during the homogenization step. These mechanical differences have resulted in preparation of suitable fine grain emulsions with the Manton Gaulin mill and objectionable grainy emulsions with the Charlotte colloid mill even when the same lignosulfonate and emulsifying agent are employed. While the exact reasons for these differences are not known with certainty, it is believed that the lignosulfonates from spent sulfite liquor are such powerful stabilizers for the asphaltic particles that if the initial shearing action exerted on the emulsion components within a short period after milling is not sufficiently high to finely divide the particles, the lignosulfonate will surround the particle with such attraction that subsequently exerted shearing action or shearing forces subsequently generated are of little effect in further reducing the particle size. In the Charlotte mill, it is believed that the large stabilized particles pass through the serrations of the cone with little or no subsequent reduction by shear. Subjecting the grainy emulsions to additional centrifugal shearing action has been found to be ineffective to reduce the initially formed emulsion. Surprisingly, even if the initially low shear prepared emulsions are subsequently subjected to the forces in the high shear mill, there is no subsequent reduction by shear. There appears to be an inverse correlation between the shear exerted initially and the amount of emulsifying quantity needed. Thus on the high shear equipment, it is not necessary to utilize a desulfonated lignosulfonate or an emulsifying agent. As the shearing action exerted initially decreases from that exerted in a high shear mill such as the Manton Gaulin, the extent of the desulfonation and the amount of emulsifying agent that are necessary become critical to the successful production of asphalt emulsions with lignosulfonates. Desulfonation of the lignosulfonate has been found to provide such compositions that are especially tailor-made for use on moderate to low shear mills and that enable production of suitable emulsions on any of such mills which subject the emulsion components to initially slow shearing action.

As used hereinbelow, the term moderate to low shear is meant to refer to an initial shearing force of less than about $150 \times 10^6$ dynes/cm$^2$. Colloid mills such as the Charlotte Mill referred to hereinabove and certain ultrasonic mills (available from Sonic Corp., Stamford, Ct.) are estimated to generate shearing forces of about $140 \times 10^6$ dynes/cm$^2$.

Colloid mills, For example as produced by P&O Machine Company, Savannah, Ga., are estimated to generate shearing forces of about $60 \times 10^6$ dynes/cm$^2$ or less. The design of this particular mill has a smooth rotor and stator.

All of such colloid mills generate shearing forces that are encompassed by the term low to moderate shearing force and all of such mills exert a relatively slow shearing action on the emulsion components when they are initially admixed and milled. It will be understood that the shearing forces recited herein are those that have been obtained on laboratory equipment designed to simulate the construction and operation of such low to moderate shear-slow shearing action industrial colloid mills and are not absolute.

Shearing forces below about 150 dynes/cm$^2$ have been found to be reasonably consistent when employing laboratory equipment and appear to correlate to the conditions encountered with a variety of industrial mills since emulsions thus defined have been tested and found to be operable on actual industrial colloid mills at different locations. However, to the extent that it is possible that these shearing forces may vary with different apparatus, mill design, etc. which nevertheless exert low to moderate shearing forces and slow initial shear under which the emulsions of the invention may be produced, the shearing forces are viewed as a screening technique for evaluating the ability to produce fine grain asphalt emulsions on these types of colloid mills in accordance with the invention.

DETAILED DESCRIPTION OF THE PREFERRED EMBODIMENT

EXAMPLE 1

A. (1) Asphalt emulsions were prepared employing a Charlotte Colloid Mill having an initial shearing force of less than $150 \times 10^6$ dynes/cm$^2$ using two fully sulfonated lignosulfates: "NORLIG 41 G", an alkaline, cooked, crude spent sulfite lignosulfonate and "MARASPERSE N-22", a hardwood spent lignosulfonate purified to remove reducing sugars. Portions of each lignosulfonate corresponding to about 1 weight percent were admixed with about 62 weight percent of Mid-West Asphalt 120-150, (Koch Fuels, Greenbay, Wis.) in a G-100 Charlotte Mill. The Asphalt has an ASTM penetration of about 120 to 150. The resultant emulsions were found to break very rapidly forming a two layered, heterogeneous system within 24 hours. It was not possible to produce stable homogeneous emulsion systems with these lignosulfonate compositions.

A (2) The same results obtained in A-1 above were obtained when amounts varying from 5 to 15 weight percent of T-DET-N-307 ethoxylated nonyl phenol emulsifiers were added to the lignosulfonate and heated at 60°-70° C. with agitation for 1 hour prior to admixture with the asphalt in the Charlotte Mill.

A. (3) The above experiment was repeated except that the "NORLIG 41-G" and "MARASPERSE N-22" were desulfonated to have a sulfonic sulfur content of less than 3 weight percent by cooking the materials in alkaline medium at a temperature of about 230° C. The sulfonic and non-sulfonic sulfur content was determined by the method described at page 850 of "Analytical Chemistry" in Vol. 32, No. 7 for June, 1960. Portions of the desulfonated materials were admixed with amounts of T-DET-N-307 emulsifying agent varying from 5 to 15 weight percent and heated for 1 hour at 60°-70° C. with agitation. An amount of the lignosulfonate-emulsifying agent corresponding to about 1 weight percent and about 62 weight percent of Asphalt 120-150 were fed to the Charlotte Mill. Stable homogeneous emulsions were produced with each of the lignosulfonate emulsion-conditioners compositions. No settlement into heterogeneous layers was observed after 24 hours.

B. "MARACELL XE" lignosulfonate, an oxidized, desulfonated hardwood product having the following typical analysis, and having a sulfonic sulfur content of less than 3 weight percent was provided.

MARACELL XE POWDER

| | % |
|---|---|
| pH (3% solution) | 12.0 |
| Total Sulfur as S, % | 5.0 |
| Sulfate, Sulfite as S, % | 2.3 |
| Sulfonic Sulfur as S, % | 2.7 |
| Total Calcium, % | 0.1 |
| Total Sodium, % | 20.0 |
| Reducing Sugars, % | Trace |
| Methoxyl, % | 5.9 |
| Solids Content, % | 95 |
| Bulk Density, (lbs./cu. ft.) | 35 |

Asphalt emulsions were produced from about 1% of an emulsion-conditioner composition comprising 86.7 parts "MARACELL XE", 12.5 parts Carbowax 400 and 0.8 parts Carbopol 941, and about 65.2% Asphalt 120-150 employing an industrial Charlotte Colloid Mill, G-100. The emulsion was identified as Product B.

Asphalt emulsions were also produced on the G-100 Charlotte Mill employing from about 1% of an emulsion-conditioner composition comprising 85 parts "MARACELL XE" 15 parts Carbowax 400 and about 65.2% Asphalt 120-150.

Samples of the resulting emulsions were evaluated for suitability as SS-1 emulsions employing ANSI/ASTM D244-77 "Standard Methods of Testing Asphalt Emulsions". The emulsions were found to exhibit the properties listed in Table I. For purposes of comparison, the ASTM specifications for SS-1 asphaltic emulsions are also listed in the table.

TABLE I

| | Asphalt Emulsion Type: SS-1 | | | |
|---|---|---|---|---|
| | ASTM | | Product | Product |
| Tests: | Min. | Max. | B | B-1 |
| Viscosity, Furol at 77° F. (secs.) | 20 | 100 | 43.1 | 49.6 |
| Storage Stability, 24 hrs., % | | 1 | 0.1 | 0.5 |
| Sieve Test, % | | 0.1 | Trace | Trace |
| Demulsibility, % 50 ml. (.1N CaCl$_2$) | | | Trace | Trace |
| Cement Mixing Test, % | | 2.0 | 0.1 | 0.2 |
| Distillation to 500° F. | | | | |
| Water % | | | 34.8 | 34.8 |
| Oil % | | | Trace | Trace |
| Residue % | 57 | | 62.2 | 65.2 |
| Tests on Residue | | | | |
| Penetration at 77° F. 100 g., 5 secs. | 100 | 200 | 122 | 129 |
| Ductility at 77° F. 5/60 cm. | 40 | | 100+ | 100+ |
| Solubility in CS$_2$ | 97.5 | | 99.97 | 99.97 |
| Ash; % | | | 0.06 | 0.08 |
| Specific Gravity at 77° F. | | | 1.026 | 1.023 |

The tests as outlined in Table I are standard methods employed in the art to gauge performance requirements for typical applications of emulsified asphalt. Characteristics of the asphalt emulsions as indicated by the tests are as follows:

Furol Viscosity is a measure of the consistency of the emulsion, i.e. it must be capable of flow without run off or breakdown.

Storage Stability, 1 day measures the ability of an emulsified asphalt to remain as a uniform dispersion during storage. A measured representative sample is placed in each of two glass cylinders. They are stoppered and allowed to stand at laboratory temperature for 24 hours. A 50 g. sample from each cylinder is siphoned from the top. The samples are placed for a set time in an oven heated to a prescribed temperature, then they are removed, cooled and weighed. After the top sample is removed, all but a small portion of the asphalt emulsion remaining in each cylinder is siphoned off. A 50 g. sample of the portion that is left is put through the same procedure as for the top samples. The storage stability is expressed as the numerical difference between the average percentage of residue in top samples and the bottom samples.

Sieve Test (also a measure of storage stability and uniformity) is used to find the amount of asphalt in the form of rather large globules that will not provide thin and uniform coatings of asphalt on the aggregate particles. A representative sample of emulsified asphalt is poured through a No. 20 sieve; the sieve and retained asphalt are rinsed after which the sieve and asphalt are dried in an oven and the amount of retained asphalt determined by weighing.

Demulsibility indicates the relative rate at which the colloidal asphalt globules in the emulsion will break when spread in thin films on soil or aggregate. In the test, a solution of calcium chloride and water is thoroughly mixed with emulsified asphalt and poured over a sieve to determine how much the asphalt globules coalesce. This test is usually employed to test rapid setting (RS) emulsions and for these types the minimum amount of demulsibility for RS emulsions is 60% (calculated by A/Bx100 where A is the average weight of demulsibility residue from three tests of each sample of emulsified asphalt and B is the weight of the residue after distillation at 500° F.). Calcium chloride does not have much effect on anionic SS-1 emulsions and for this reason, only a trace of residue is retained on the sieve as indicated in the Table.

Cement Testing evaluates the relative rate at which SS-1 emulsions will break when spread in thin films on soil or aggregate. The product must mix with water and aggregate without breakdown. After mixing, the anionic emulsions react with the aggregate. In the test, a sample of emulsified asphalt is mixed with finely ground portland cement and the mixture washed over a 1.40 mm (No. 14) sieve. The ASTM specifications recite the maximum amount of material that may be retained on the sieve as the percentage of break in the cement mixing test.

The composition consistency of the asphalt emulsion is evaluated by the Distillation to 500° F. test which is designed to determine the relative percentages of asphalt, water and oil in the emulsion by distilling the emulsion. The relative percentages in turn gauge the durability of the asphalt, e.g., the ability of the asphalt to withstand traffic densification and other properties such as weatherability.

Tests on Residue evaluate the emulsion to determine the extent that the characteristics of the base asphalt are retained in the emulsion. The Penetration Test is a test of consistency and measures the depth of penetration in units of 0.1 mm of a standard needle under a load of 100 g. for 5 seconds when the asphalt is at a temperature of 77° F. The Solubility Test is a measure of the purity of the asphalt. The portion of the asphalt that is soluble in specified solvents represents the active components. Specific Gravity, although not normally a specification item, is helpful in making volume corrections at elevated temperatures and determining necessary quantities. Asphalt cements in general fall within a specific gravity range of about 1.0 to 1.05. Ductility measures the ability of the asphalt to be extended or pulled into a narrow thread. The test is made by molding a briquette of asphalt which is brought to a standard test temperature in a water bath. It is pulled at a specified rate of speed until the thread connecting the two ends breaks. The elongation, in centimeters, at which the thread of material breaks is designated as ductility.

It will be seen from the results of the above Table I that partially desulfonated lignins in accordance with this invention are useful in the preparation of asphalt emulsions that meet the ASTM specifications and requirements for use as SS-1 type emulsions when produced on colloid mills having low to moderate shearing forces and a slow shearing action.

EXAMPLE 2

An asphalt emulsion was produced as described in Example 1 employing several emulsion/condtioner compositions with the mid-western Asphalt 120-150, (Koch Fuels, Greenbay, Wis.). The emulsions were produced in a laboratory Colloid Mill having a smooth rotor and stator with either a 1/6 inch or ¼ inch gap setting. It is estimated that the 1/16 inch gap setting generates shear forces of about $60 \times 10^6$ dynes/cm$^2$ while the ¼ inch gap setting generates shear forces on the order of about $20 \times 10^6$ dynes/cm$^2$., the latter being a shear force that is lower than that believed to be generated by any of the known industrial equipment currently available for use. Results at the lowest shear level are believed to be indicative that the emulsions can be produced on the lowest possible shear equipment. For purposes of comparison, emulsions were prepared from the same asphalt employing commercially available additives.

The resultant emulsions were evaluated utilizing certain of the ASTM methods discussed hereinabove, the results being presented in Table II which follows. In the Table, MARACELL XE and OPCOLIG A are partially desulfonated lignosulfonates derived from spent sulfite liquor; VINSOL NVX is thermoplastic resin derived from Southern pine stumps (Hercules Powder Co.); INDULIN SAL is a Kraft lignin (Westvaco, Inc.); and T-DET N-307 is an ethoxylated nonylphenol having approximately 30 ethylene oxide groups. T-DET-N 407 is an ethoxylated nonylphenol having approximately 40 ethylene oxide groups.

TABLE II

| Run No. | Mill Gap Setting | EMULSIFIER RAW MATERIAL | T-DET, % | Emulsifier charge, % | Consistency, % | Cement Mix, % Break (Max = 1%) | Settlement Tests 24-hour consistency, % (Max = 1%) | 5-day consistency % (Max = 5%) |
|---|---|---|---|---|---|---|---|---|
| 1 | 1/16″ | Vinsol | — | 1 | 67.9 | 0.01 | 0.24 | 3.73 |
| 2 | " | Indulin | — | 1 | 67.6 | 0.08 | 0.90 | 1.14 |
| 3 | " | Maracell XE | 20% N-307 | 1 | 66.5 | 0.10 | 0.47 | 0.87 |
| 4 | " | Vinsol Indulin Maracell XE | 15% N-307 | 1 | 65.8 | 0.20 | 0.40 | 4.26 |
| 5 | " | Vinsol Indulin Maracell XE | 10% N-307 | 1 | 64.5 | 0.16 | 2.51 | — |
| 6 | " | Vinsol Indulin Maracell XE | 20% N-407 | 1 | 67.2 | 0.05 | 1.39 | 5.64 |
| 7 | " | Vinsol Indulin Maracell XE | 15% N-407 | 1 | 66.3 | 0.05 | 0.49 | 16.76 |

TABLE II-continued

| Run No. | Mill Gap Setting | EMULSIFIER RAW MATERIAL | T-DET, % | Emulsifier charge, % | Consistency, % | Cement Mix, % Break (Max = 1%) | Settlement Tests 24-hour consistency, % (Max = 1%) | 5-day consistency % (Max = 5%) |
|---|---|---|---|---|---|---|---|---|
| 8 | " | Opcolig A | 15% N-307 | 1 | 61.6 | | 2.22 | — |
| 9 | ¼" | Vinsol | — | 1 | 66.3 | | 2.21 | 10.38 |
| 10 | " | Indulin | — | 1 | 68.7 | | 0.65 | 2.02 |
| 11 | " | Maracell XE | 15% N-307 | 1 | 66.3 | 0.18 | 0.55 | 1.00 |
| 12 | " | Opcolig A Vinsol Indulin Maracell XE 42.5% | 15% N-307 | 1 | — | — | 0.59 | 1.88 |
| 13 | " | | 15% N-307 | 1 | 66.7 | 0.05 | 0.37 | |
| | | Maracell XE Opcolig A | | 0.8 | 64.8 | 0.10 | 0.00 | |
| 14 | 4/16 | 42.5% | " | 1 | 68.0 | 0.01 | 0.21 | |
| | | Maracell XE 42.5% Opcolig A | | | | | | |
| | | 42.5% | " | 0.8 | 64.3 | 0.02 | 0.00 | |
| | | Maracell XE 42.5% Opcolig A | | | | | | |
| 15 | 1/16; grooved rotor and stator - 140 × 10⁶ dynes/cm.² | 42.5% Maracell XE 42.5% Opcolig A | " | 1 0.8 | 63.2 62.2 | 0.03 0.01 | 0.00 0.00 | |

It will be seen from the data in Table II that asphalt emulsions have been produced that are especially suited for use in low to medium shear colloidal mills with performance at least equal to additives commercially available. As is evidenced from a comparison of Runs 9 and 11, emulsions of this invention evidence superior performance when compared with Vinsol and Indulin commercial additives at the lowest initial shear forces utilized in the testing. The results obtained with T-DET-307 are believed to be the result of optimum hydrophobic to hydrophilic balance present in the emulsifying agent when used in conjunction with the particular asphalt/lignosulfonate. Results with T-DET-407 indicated that this emulsifying agent is more hydrophobic than is desired for optimum performance with the particular asphalt/lignosulfonate combination being tested in the example.

Asphalt emulsions of the invention similar to those above described have been produced with asphalt during testing at several asphalt producing companies having varying equipment, including a P&O Machine Company smooth rotor Colloid Mill, with comparably good results being obtained.

It will be understood that many changes and modifications can readily be made and adapted in embodiments in accordance with the present invention and without substantially departing from its apparent and intended sprit and scope, all in pursuance and accordance with the same as it is set forth and defined in the appended claims.

I claim:

1. An anionic asphalt emulsion-conditioner composition consisting essentially of an admixture of (a) from about 80 to 90 percent by weight of a partially desulfonated lignosulfonate, derived from spent sulfite liquor and that has been subjected to alkaline hydrolysis and partial desulfonation, or mixture of such lignosulfonates, said lignosulfonates containing combined organic sulfonic sulfur after partial desulfonation of less than about 3 weight percent; (b) from about 5 to 15 weight percent of a nonionic or anionic emulsifying agent; and (c) from 0 to about 5 weight percent of a thickener.

2. An anionic asphalt emulsion-conditioner composition as claimed in claim 1 wherein said lignosulfonate is an oxidized, desulfonated hardwood product or an oxidized, desulfonated softwood product.

3. A liquid anionic emulsion-conditioner composition as claimed in claim 1 wherein said emulsifer agent is selected from the group consisting of ethoxylated nonyl phenols and polyethylene glycols.

4. A liquid anionic emulsion-conditioner composition as claimed in claim 2 wherein the lignosulfonate is a mixture of lignosulfonates.

5. A liquid anionic emulsion-conditioner composition as claimed in claim 4 wherein said emulsifying agent is ethoxylated nonyl phenol.

6. An anionic asphalt emulsion-conditioner composition as claimed in claim 1 wherein there is present 5% of a thickener and said thickener is a carboxyvinyl polymer.

7. An anionic asphalt emulsion-conditioner composition consisting essentially of an admixture of (a) 85 to 86.7 parts by weight of partially desulfonated, hydrolyzed, oxidized lignosulfonate derived from spent sulfite liquor and containing combined organic sulfonic sulfur of less than about 3 weight percent; (b) about 12.5 weight percent of polyethylene glycol; and (c) from 0 to 0.8 weight percent of a carboxyvinyl polymer thickener.

8. An anionic asphalt emulsion-conditioner composition consisting essentially of an admixture of (a) about 80 to 90 weight percent of (1) a partially desulfonated, hydrolyzed, oxidized hardwood or softwood lignosulfonate derived from spent sulfite liquor and containing combined organic sulfonic sulfur of less than about 3 weight percent of (2) a mixture of said lignosulfonates; and (b) from about 20 to 10 weight percent of an ethoxylated nonyl phenol emulsifying agent.

9. An anionic asphalt emulsion comprising at least 57 weight percent of an asphaltic material having a penetration between about 40 and 250 and from about 0.5 to 1.5 weight percent of an emulsion-conditioner composition as claimed in claim 1.

10. An anionic asphalt emulsion comprising at least 57 weight percent of an asphaltic material having a penetration of about 40 to 250 and from about 0.5 to 1.5 weight percent of an emulsion-conditioner compound as claimed in claim 7.

11. An anionic asphalt emulsion comprising at least 57 weight percent of an asphaltic material having a penetration of about 40 to 250 and from about 0.5 to 1.5 weight percent of an emulsion-conditioner as claimed in claim 8.

12. An anionic asphalt emulsion comprising a major proportion of an asphaltic material having a penetration within the range of 120 to 150 and about 1 weight percent of an emulsion-conditioner composition consisting essentially of (a) 85 to 86.7 parts by weight of a partially desulfonated, hydrolyzed, oxidized lignosulfonate derived from spent sulfite liquor and containing combined organic sulfonic sulfur or less than about 3 weight percent; (b) about 12.5 weight percent of polyethylene glycol; and (c) from 0 to 0.8 weight percent of a carboxyvinyl polymer thickener.

13. An anionic asphalt emulsion comprising a major proportion of an asphaltic material having a penetration within the range of about 120 to 150 and about 1 weight percent of an emulsion-conditioner composition consisting essentially of (a) about 80 to 90 weight percent of (1) a partially desulfonated, hydrolyzed hardwood or softwood lignosulfonate derived from spent sulfite liquor and containing combined organic sulfonic sulfur or less than about 3 weight percent or (2) a mixture of said lignosulfonates, and (b) from about 20 to 10 weight percent of an ethoxylated nonyl phenol emulsifying agent.

14. In a method of producing anionic asphalt emuslions wherein an asphaltic material is admixed with an emulsifying agent and homogenized through the action of shearing forces exerted on said mixture in a colloid mill of the type that generates low to moderate shearing forces and exerts a slow shearing action as said asphaltic material and emulsifying agent are initially admixed, the improvement which comprises admixing in such colloid mill an asphaltic material and an emulsifier-conditioner composition as claimed in claim 1.

15. In a method of producing anionic asphalt emulsions wherein an asphaltic material is admixed with an emulsifying agent and homogenized through the action of shearing forces exerted on said mixture in a colloid mill of the type that generates low to moderate shearing forces and exerts a slow shearing action as said asphaltic material and emulsifying agent are initially admixed, the improvement which comprises admixing in such colloid mill an asphaltic material and an emulsion-conditioner composition as claimed in claim 7.

16. In a method of producing anionic asphalt emulsions wherein an asphaltic material is admixed with an emulsifying agent and homogenized through the action of shearing forces exerted in a colloid mill of the type that generates low to moderate shearing action as said asphaltic material and emulsifying agent are initially admixed, the improvement which comprises admixing in such colloid mill an asphaltic material and an emulsion-conditioner composition as claimed in claim 8.

17. An anionic asphalt emulsion comprising a major proportion of an asphaltic material having a penetration between about 40 and 250 and a minor proportion of an emulsion-conditioner composition consisting essentially of (a) from about 80 to 100 percent by weight of a partially desulfonated lignosulfonate or mixture of such lignosulfonates derived from spent sulfite liquor that has been subjected to alkaline hydrolysis and partial desulfonation, said lignosulfonate containing combined organic sulfonic sulfur after partial desulfonation of less than about 3 weight percent; (b) from 0 to 20 weight percent of a nonionic or anionic emulsifying agent; and (c) from about 0 to about 5 weight percent of a thickener.

18. In a method of producing asphalt emulsions wherein an asphaltic material is admixed with an emulsifying agent and homogenized through the action of shearing force exected on said mixture in a colloid mill of the type that generates low to moderate shearing force of less than about $150 \times 10^6$ dynes/cm$^2$ as said asphaltic material and emulsifying agent are initially admixed, the improvement which comprises admixing in such colloid mill in asphaltic material and an emulsion-conditioner composition comprising from about 80 to 100 percent by weight of a partially desulfonated lignosulfonate or mixture of such lignosulfonates derived from spent sulfite liquor that has been subjected to alkaline hydrolysis and partial desulfonation, said lignosulfonate containing combined organic sulfonic sulfur after partial desulfonation of less than about 3 weight percent; (b) from about 0 to 20 weight percent of a nonionic or anionic emulsifying agent; and (c) from about 0 to about 5 weight percent of a thickener.

19. The method of claim 14 wherein the shearing forces generated in said colloid mill are less than about $150 \times 10^6$ dynes/cm$^2$.

20. The method of claim 15 wherein the shearing forces generated in said colloidal mill are less than about $150 \times 10^6$ dynes/cm$^2$.

21. The method of claim 16 wherein the shearing forces generated in said colloidal mill are less than about $150 \times 10^6$ dynes/cm$^2$.

* * * * *